Aug. 9, 1966   G. SLAYTER   3,265,478
METHOD FOR FORMING CRYSTAL-FREE GLASS FIBERS
Filed March 24, 1965   2 Sheets-Sheet 1

INVENTOR.
GAMES SLAYTER, DECEASED,
BY THE PARK NATIONAL BANK
OF NEWARK, EXECUTOR
ATTORNEYS

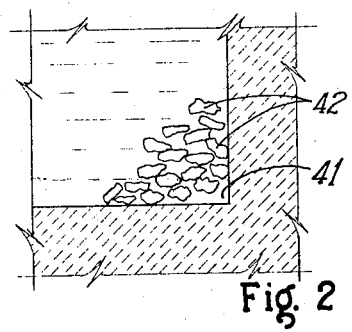
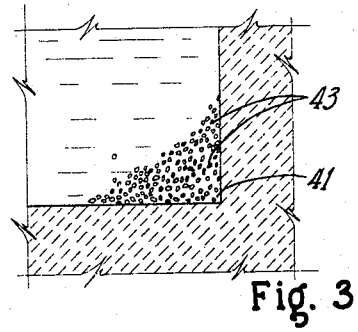
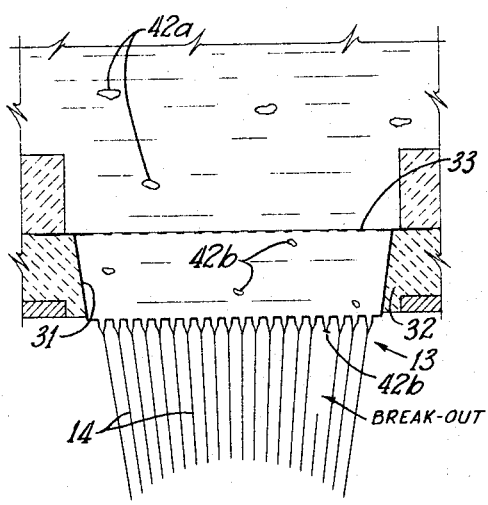
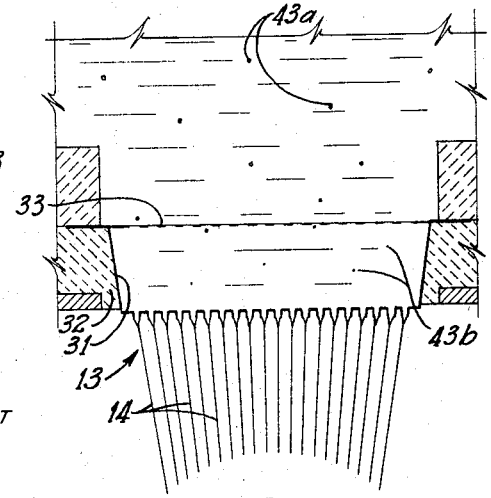
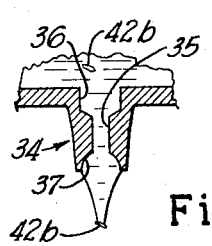
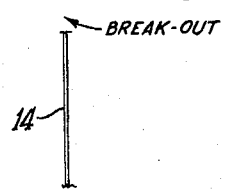

United States Patent Office 3,265,478
Patented August 9, 1966

3,265,478
METHOD FOR FORMING CRYSTAL-FREE GLASS FIBERS
Games Slayter, deceased, late of Newark, Ohio, by The Park National Bank of Newark, executor, Newark, Ohio, assignor to Owens-Corning Fiberglas Corporation, Toledo, Ohio, a corporation of Delaware
Filed Mar. 24, 1965, Ser. No. 442,854
3 Claims. (Cl. 65—2)

This invention relates to a method for producing glass fibers or other elongate glass bodies and more particularly to a method for producing elongate glass bodies having a reduced number of interruptions occurring during production.

Glass fibers, particularly continuous ones known in the art as filaments, are commonly produced by attenuating streams of molten glass flowing from a pool thereof. According to one specific technique, glass is melted in a suitable tank and flows therefrom through a forehearth to a bank of bushings placed under the forehearth. Each of the bushings includes a chamber, usually with an auxiliary heat source, through which the molten glass flows from the forehearth to and through a multiplicity of orifices in the bottom of the bushing. Streams of the glass flowing from the orifices are attenuated into a multiplicity of fine continuous fibers.

Such fibers also can be made from a "direct melt" bushing having platinum walls through which current is passed to heat and melt glass marbles or glass batch fed thereto. The molten glass in this case also is attenuated into fibers from a stream thereof flowing from a multiplicity of orifices in the bottom of the bushing.

The molten glass or melt in the glass tank, where used, and in the bushings is maintained at a sufficiently high temperature, above the melting points of all constituents of the glass, so that all of such constituents remain in their molten states in the melt. However, in almost any tank or bushing, there are corners or regions where the glass tends to stagnate or move relatively slowly in comparison to glass in other portions of the tank or bushing. These corners or regions are frequently at a temperature below that in other portions of the tank or bushing and may occasionally be low enough that the more refractory constituents of the glass will tend to come out of solution and form crystals in the molten glass. A further drop in temperature will produce similar tendencies in other constituents of the glass, until all of the constituents solidify at a sufficiently low temperature. This occurrence is termed fractional crystallization. Since glass compositions are chosen to be difficult to crystallize and do not provide nuclei upon cooling, the crystallizing constituents come out of solution around impurities in the molten glass which constitute "points of departure" around which the crystals will form. In the usual fiber-forming operation, there are only relatively few such impurities in the glass which may be highly refractory air-borne particles depositing in the glass batch before it is melted, or which may be silica grains in the batch itself. With only a few impurities, the material tending to come out of solution will undesirably form a relatively few large crystals, one around each of the impurities.

Many of these few large crystals eventually are carried away from the stagnating corners or areas into the principal moving pool of molten glass, at which time the crystals again reach a temperature above the melting points of all the constituents and will tend to go back into solution. However, this requires time and many of the crystals are still of substantial size when they reach the orifices of the bushings. Some of these crystals are still large enough to completely bridge the cross-sectional areas of filaments attenuated to a fine diameter below the orifices and cause the resulitng filaments to break in two, known as a "break-out." When this occurs, production of all filaments common to a strand must be stopped until the broken filament and others in the group can be restarted properly.

In accordance with the present invention, it has been discovered that a nucleating agent can be added to the glass, either to the batch, to a preformed glass marble, to cullet or to the molten glass, to provide a large number of "points of departure" in any stagnating corner region or other cool region where crystals tend to form, and that relatively small crystals will then form around these "points," rather than a few large ones. This result is believed to be explained by the following theory, which is presented solely for the purpose of disclosing the invention, and is in no way to be construed as limiting. For any glass, there is a temperature below the melting point where there will be a given amount of material in a given time which will tend to crystallize or come out of solution. The same amount of material will have this tendency whether there are only a few or a large number of points of departure present. Therefore, it will form a few large crystals if a few impurities are present or it will form many small crystals if many nuclei established by a nucleating agent are present. As is true for the large crystals, the many small ones eventually are also carried into the main pool of molten glass and also will tend to go back into solution as they flow toward the orifices of the bushing. However, because these crystals are very small due to the fact that the many nuclei are small as occurs when nuclei form from solution in accordance with the invention, and therefore have a relatively large surface-to-volume ratio, they are either completely dissolved in the main pool of molten glass or are reduced to such a small size that they cannot bridge the diameters of the attenuated filaments and cause them to part. Hence, substantially all break-outs caused by crystals are eliminated and bushing production is increased correspondingly.

It is, therefore, a principal object of the invention to provide an improved filament-forming operation.

Another object of the invention is to reduce the number of break-outs occurring during a filament-forming operation.

A further object of the invention is to reduce the size of crystals formed in a pool of molten glass.

A still further object is to provide a fiber-forming glass composition characterized by a nucleating material content which will provide a fiber-forming operation relatively free of break-outs.

Other objects and advantages of the invention will be apparent from the following detailed description of a preferred embodiment thereof, reference being made to the accompanying drawings, in which:

FIG. 2 is a greatly enlarged, fragmentary view in cross section of a corner of the melting tank of FIG. 1 showing a few large crystals formed in molten glass;

FIG. 3 is a view similar to FIG. 2 but showing small crystals in the molten glass after treatment in accordance with the invention;

FIG. 4 is an enlarged, fragmentary view in cross section of one of the bushings shown in FIG. 1 with molten glass therein containing crystals somewhat similar to those shown in FIG. 2;

FIG. 5 is a fragmentary view in cross section similar to FIG. 4 but with molten glass in the bushing containing crystals somewhat similar to those shown in FIG. 3.

FIG. 6 is a greatly enlarged, fragmentary view in cross section of the top of the bushing of FIG. 4; and FIG. 7 is a greatly enlarged, fragmentary view in cross section of the tip of the bushing of FIG. 5.

Figure 1:
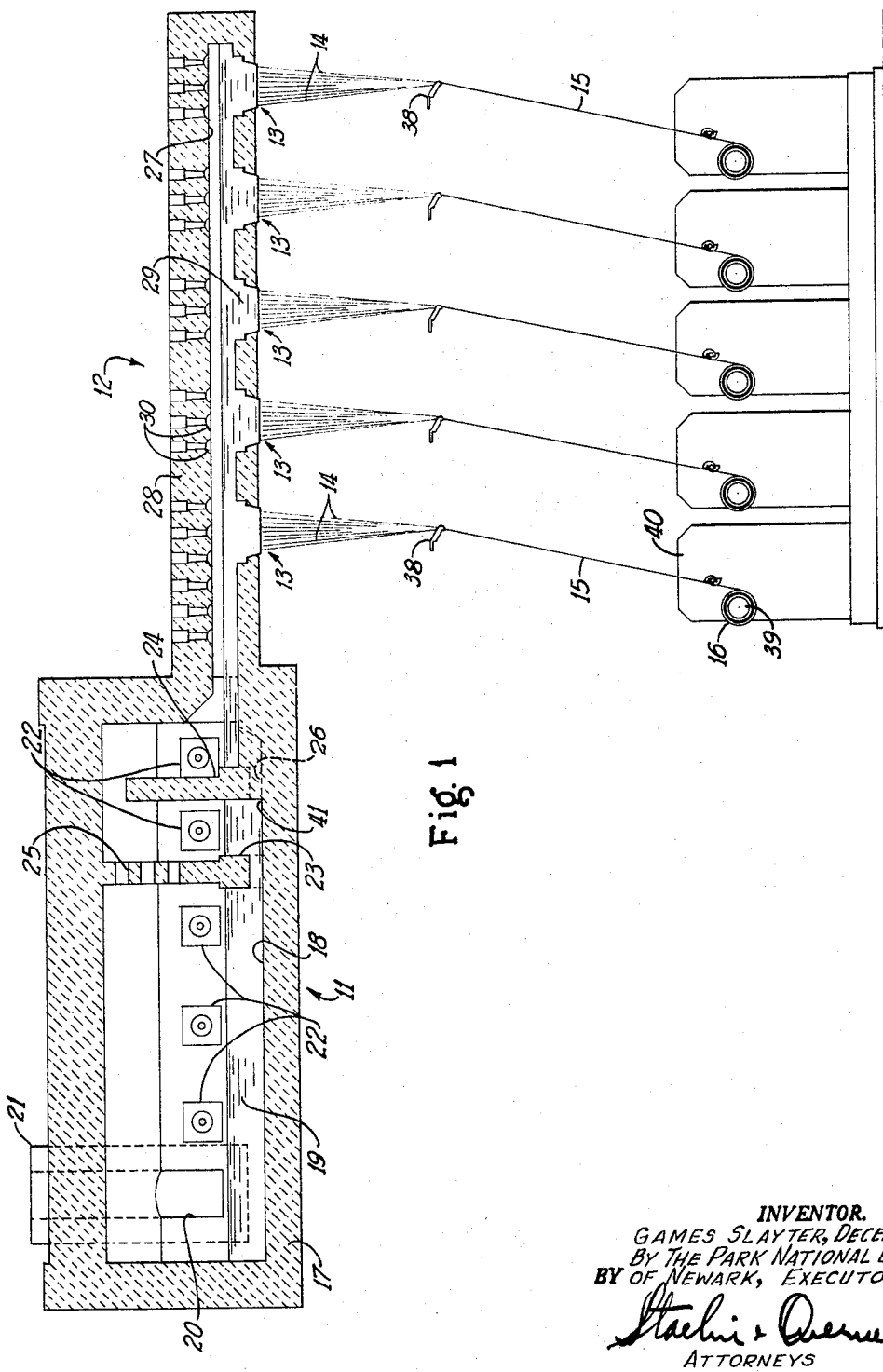
FIG. 1 is a somewhat schematic view in cross section of apparatus for forming fibers, which apparatus includes a glass melting tank, a forehearth, and a bank of bushings from which filaments are attenuated.

It is to be understood that the accompanying drawings are intended only for illustrative purposes and that the crystal sizes shown therein do not necessarily bear an accurate relation to the size of the objects with which they are shown. Further, the shapes of the illustrated crystals are not necessarily the same as the shapes of actual crystals.

Referring in particular to FIG. 1, a melting tank indicated at 11 is used to melt glass which flows to a forehearth indicated at 12 and to a plurality of bushings 13. Streams of molten glass flowing from orifices in the bushings 13 are attenuated into elongate bodies or filaments 14 which are gathered into a strand 15, and the strand 15 is wound onto a package 16.

The melting tank 11 includes refractory walls 17 forming a chamber 18 holding a pool 19 of molten glass. Glass in the form of batch, cullet, or marbles, for example, is supplied to the tank 11 through an opening 20 from a glass container 21, and is melted by a plurality of burners 22. An upper baffle 23 and a lower baffle 24 divide the tank 11 into several zones and direct the flow of molten glass therethrough. The upper baffle 23 has a plurality of ports 25 through which heat and combustion gases can be distributed through the tank 11 and the lower baffle 24 has a number of passages 26 in the lower part thereof through which the molten glass can flow into a chamber 27 of the forehearth 12 formed by refractory walls 28. The molten glass forms a more shallow pool 29 in the forehearth 12 which enables the glass to be heated thoroughly by means of a plurality of radiant cup burners 30 located in an upper part of the refractory walls 28.

As shown in FIGS. 4 and 5, the molten glass flows from the forehearth 12 through a bushing chamber 31 formed by walls 32 of each of the bushings 13. Each of the bushings contains a perforate platinum plate 33 through which the glass must pass, which plate is resistance heated by an electrical power source (not shown).

The glass flows subsequently through a multiplicity of bushing tips 34 (see FIGS. 6 and 7) each of which contains an orifice 35 and each of which can also include an upper bore 36 and a lower counter-bore 37, as is known in the art. From here the molten glass is attenuated into the filaments 14 which are collected by a gathering shoe 38 (FIG. 1) into the strand 15 which is wound onto the package 16 located on a collet 39 driven by a power unit 40.

Although most of the molten glass in the pool 19 will flow toward the forehearth 12 as it melts, some of the glass will have a tendency to stagnate in one or more corners or regions of the tank 11, such as the corner 41 (see FIGS. 2 and 3) between the lower refractory wall 17 and the lower baffle 24. The temperature of such regions or corners is frequently below that in the main part of the pool 19 and may be below the melting point of at least one substance or constituent which may crystallize from the glass. In the case, the constituent will tend to solidify or come out of solution but will not do so readily unless there are points of departure about which it can gather. However, any molten glass will have impurities therein which will serve this function. The impurities may be air-borne grains of silica or other highly refractory material deposited in the glass before it is supplied to the melting tank 11 or zircon grains from a refractory block, or they may be unmelted silica grains which are part of the glass composition. Because there is a given amount of material which will tend to come out of solution at a given temperature, and because there are relatively few points around which the constituents can gather into crystals, each of the crystals will be relatively large. Such crystals are shown for illustrative purposes in FIG. 2 and are designated by the numeral 42.

On the other hand, when there are a large number of points of departure in the molten glass around which a constituent can gather into crystals, each crystal is small because there is only a given amount of the constituent which will tend to come out of solution and there are many points around which it gathers. Such crystals are shown in FIG. 3 and are designated by the numeral 43.

The increase in the number of points of departure is accomplished by adding a nucleating agent to the glass before it is supplied to the melting tank or to the molten glass in the pool 19. The nucleating agent can be gold, platinum, palladium, rhodium or silver, for example, and is preferably added in granular form as an oxide or salt such as a nitrate, chloride or sulfate in an amount of about three parts per million although this can vary between one-half part per million and ten parts per million to achieve the above effect. The agent melts and disperses as a liquid through the glass to establish a multiplicity of nucleating points, each of which constitutes only one or a few molecules, which points are greater in number and smaller in size than the silica grains or other highly refractory impurities found as solid particles in a glass. It may be noted that although such nucleating agents are expensive, only minute parts are required so that little cost is added to the operation.

The nucleating agent can be added to any glass composition which is suitable for producing glass fibers by continuous pulling processes. The viscous properties at high temperatures limit the types which may be used successfully in the melters and bushings. One such glass as described in U.S. Patent 2,334,961 is composed of 16–19% CaO, 3–6% MgO, 12–16% $Al_2O_3$, 52–56% $SiO_2$, and 9–11% $B_2O_3$, or more specifically 17.5% CaO, 4.5% MgO, 14.0% $Al_2O_3$, 54.0% $SiO_2$, and 10.0% $B_2O_3$.

Because the nucleating agents according to the invention are at the high temperatures employed in the fiber-forming process, they preferably are of the noble metal class and are thus metals whose oxides are unstable at high temperatures. These nuclei or small molecular aggregates of the noble metals, silver, gold, platinum, palladium, and rhodium are formed from solutions of these metals when the glass is melted. Particularly where products of combustion of burners used as a heating source have an insufficiency of oxygen, the metal oxides will be reduced to the noble metals which then separate as metal nuclei throughout the glass. However, the metal compounds first added to the glass at the time of melting may be any oxide, salt, or compound of the metals as previously indicated which will melt and react with the melting glass to first provide a glass having a noble metal compound dissolved therein.

The stagnant glass and the crystals therein eventually are carried into the main part of the pool 19 and into the pool 29 in the forehearth 12. The main parts of these pools are usually maintained at temperatures above that at which all constituents in the glass melt so that none of the constituents which may crystallize tend to come out of solution. This means that the crystals 42 or 43 formed in the stagnant areas will tend to go back into solution, being at temperatures above their melting point. However, this resolution progresses at a slow rate because the temperatures of the pools 19 and 29 are seldom much higher than the temperature at which the crystalline material melts, so that the crystals are only partially dissolved by the time they reach the bushings 13. By way of illustration, the crystals 42 are illustrated as crystals 42a at the time they reach the bushing 13 of FIG. 4. As the crystals 42a in the molten glass of the pool 29 pass downwardly through the heated, perforate plate 33, they dissolve at a faster rate and are reduced further in size, as represented by crystals 42b in FIGS. 4 and 6, by the time they reach the bushing tips 34. Although the crystals 42b are usually sufficiently small to pass through the orifices 35, they are often large enough to bridge completely the cross sectional area of the filament 14 and to cause it to part, thereby causing a break-out which is so designated in FIGS. 4 and 6. When this occurs, the collet 39 must be stopped and the broken portion of the filament hanging just below the bushing tip 34 pulled downwardly and gathered with the other filaments 14. This is time consuming and results in considerable loss in production time. Further, since the new strand formed after the operation has been restarted, cannot be tied readily to the old strand, the package 16 must be discarded and a new package started.

The above difficulty will not occur at all, or only infrequently, when the molten glass is nucleated according to the invention. The small crystals 43 will be carried to the bushing 13 and be even smaller in size, as represented by the crystals 43a in FIG. 5, as they are carried through the pools 19 and 29. These crystals, being initially small and having a high surface-to-volume ratio, are reduced to an even small size, as represented by the crystals 43b in FIGS. 5 and 7, as they pass through the heated perforate plate 33. The crystals 43b are so small, if in existence at all, that they will not bridge the cross-sectional area of the filaments 14 and thus will not cause a break-out or stop production.

Although the invention has been described in connection with a melting tank and bank of bushings, the same problem will occur to some extent in a direct melt bushing to which marbles or cullet is supplied. Such bushings have platinum walls heated electrically by resistance but are otherwise similar to the bushings 13. Crystals may form in stagnant areas of these bushings and are eventually carried to bushing tips and cause break-outs. By nucleating the glass in this case, the crystals again can be reduced to such a size that they cannot bridge the filaments and cause break-outs.

I claim:

1. The method of producing substantially crystal-free glass fibers which are permanently free of crystals, the method including the steps of forming a pool of molten glass, which pool has one or more areas in which a portion of the molten glass tends to stagnate at a temperature lower than that in other portions of the pool, the temperature of said one or more areas being sufficiently low that one or more constituents of the glass tends to come out of solution in crystal form, adding glass batch to one part of the pool, adding a nucleating agent to the glass, melting the glass, moving part of the molten glass through said one or more areas after the nucleating agent has been added, forming a multiplicity of nuclei in the glass by virtue of the nucleating agent, on which nuclei constituents in the glass can form into a multiplicity of minute crystals which are smaller than those which would otherwise form, moving the glass with the small crystals therein through areas of higher temperature to cause said crystals in the glass to dissolve, and subsequently forming fibers from the glass at another part of the pool spaced from said lower temperature areas after the minute crystals in the glass have substantially dissolved.

2. In a method of producing substantially crystal-free glass fibers which are permanently free of crystals, which method includes the steps of forming a pool of molten glass, which pool has one or more areas in which a portion of the molten glass tends to stagnate at a temperature lower than that in other portions of the pool, the temperature of said one or more areas being sufficiently low that one or more constituents of the glass tends to come out of solution in crystal form, and adding glass to one part of the pool, the improvement comprising: adding a nucleating agent to the glass before the molten glass reaches said one or more areas to form a multiplicity of nuclei on which constituents in the glass tending to come out of solution can gather into a multiplicity of minute crystals which are smaller than those which would otherwise form, directing the glass through areas of higher temperature sufficient to cause the crystals to substantially dissolve, and forming fibers from the glass in another part of the pool spaced from said areas.

3. The method of producing substantially crystal-free glass fibers which are permanently free of crystals, the method including the steps of forming a pool of molten glass, adding glass batch to one part of the pool, heating the pool to melt the batch, cooling portions of the glass in the pool to a temperature sufficiently low to cause a multiplicity of nuclei to form in the glass on which nuclei constituents in the glass tending to come out of solution can gather into a multiplicity of minute crystals smaller than those which would otherwise form at the lower temperature, adding a nucleating agent to the glass prior to cooling it, subsequently heating said portions of the glass to a higher temperature to cause the crystals formed to dissolve, and forming fibers from the glass at another part of the pool after the crystals in the glass have substantially dissolved.

References Cited by the Examiner

UNITED STATES PATENTS

| 3,046,084 | 7/1962 | Veazie | 65—2 |
| 3,063,788 | 11/1962 | Veazie | 65—2 |

FOREIGN PATENTS 551,562  1/1958  Canada.

DONALL H. SYLVESTER, *Primary Examiner.*

F. W. MIGA, *Assistant Examiner.*